United States Patent [19]

Douskalis

[11] Patent Number: 4,855,996

[45] Date of Patent: Aug. 8, 1989

[54] TIME DIVISION MULTIPLEX ARRANGEMENT

[75] Inventor: William Douskalis, Lincroft, N.J.

[73] Assignees: American Telephone and Telegraph Company, New York, N.Y.; AT&T Information Systems Inc., Morristown, N.J.

[21] Appl. No.: 227,839

[22] Filed: Aug. 3, 1988

[51] Int. Cl.⁴ .............................................. H04J 3/22
[52] U.S. Cl. ........................................ 370/84; 370/85
[58] Field of Search .................................... 370/84, 85

[56] References Cited

U.S. PATENT DOCUMENTS 4,763,322  8/1988  Eizenhöfer ............................. 370/84

Primary Examiner—Douglas W. Olms
Assistant Examiner—Frederick R. Jorgenson
Attorney, Agent, or Firm—Ronald D. Slusky

[57] ABSTRACT

Modems, data service units, application modules and other data communication devices, installed in a common equipment cabinet, are interconnected by way of a time division multiplexed bus. Time slots assigned to the various devices recur at a number of regularly-spaced access periods across each time division multiplex frame. The rate at which the access periods occur and the total number of access periods that make up each frame are chosen in such a way as to accommodate a mix of devices having respective bus access rates wherein there is at least one pair of rates for which neither rate of the pair is a whole number multiple of the other. The process of allocating access periods to the time slots is carried out using a known lemma to identify linear Diophantine equation solutions.

43 Claims, 7 Drawing Sheets

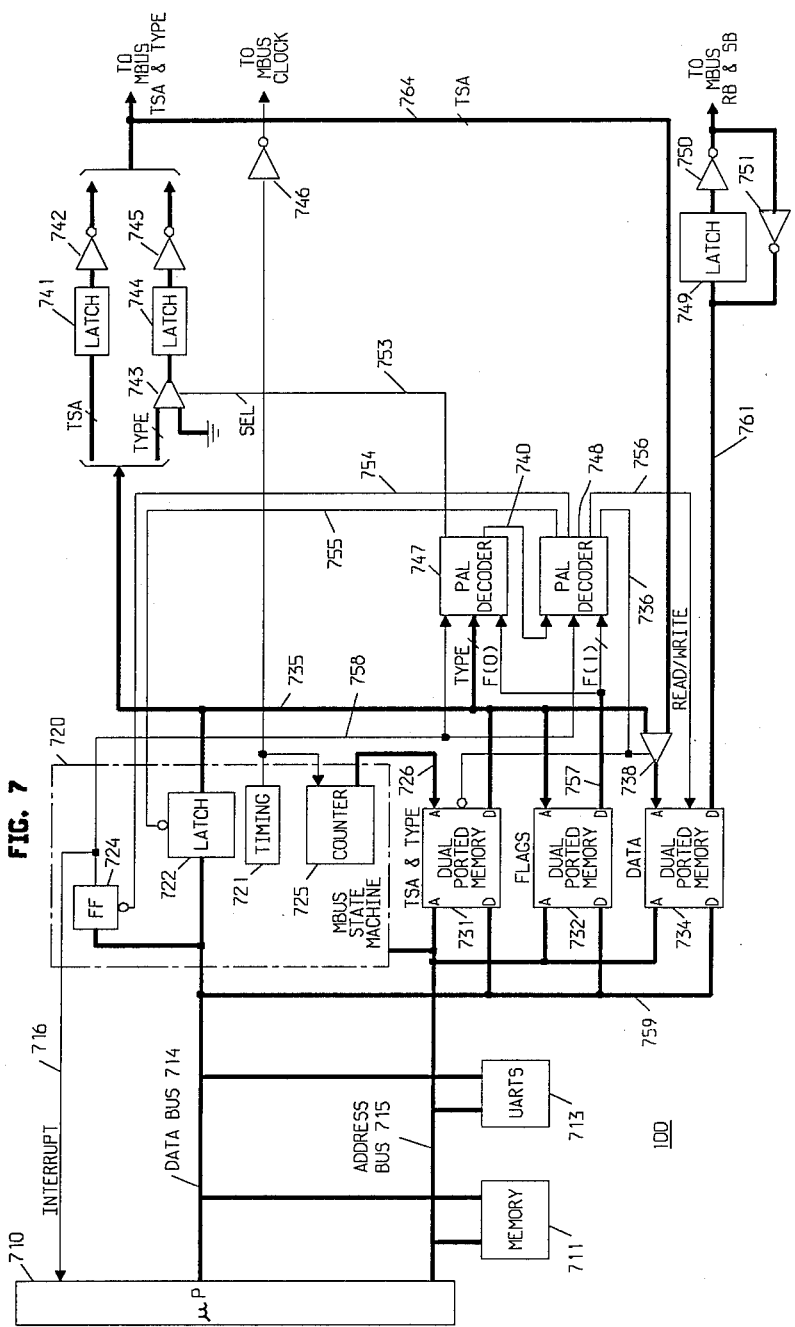

TIME DIVISION MULTIPLEX ARRANGEMENT

BACKGROUND OF THE INVENTION

The present invention relates to time division multiplex arrangements.

Time division multiplex (TDM) techniques have been in widespread commercial use in a number of applications for quite some time. Notable among these are various telecommunications applications such as the internal architecture of a PBX and in the transmission of digital signals.

Central to typical prior art TDM arrangements is the notion of a "frame" divided into a predetermined number of the aforesaid time slots. The frame has a fixed, predetermined duration. Thus each time slot recurs at a fixed frequency, or rate, referred to herein as the "frame rate". For example, then, if the frame has a duration of 125 $\mu$sec, each time slot recurs at a rate of $1/(125\times10^{-6})$ sec=8 KHz. Each device communicating on the bus is assigned to one or more time slots and, when the time slot(s) occur, the device is enabled to place data on, and/or remove data from, the bus.

As long as the devices communicating on the TDM bus need to access the bus at a rate which is some multiple of the frame rate—so that each bus access rate is a multiple or submultiple of all the others—the assignment of time slots to particular devices and the actual communication of data over the bus are straightforward. For example, a device that needs to access the bus at a rate of 8 KHz is assigned a particular one time slot on the bus. A device that needs to access the bus at a rate of, say, 16 KHz would be assigned to a particular two time slots, and so forth. Indeed, devices that need to access the bus at some submultiple of the frame rate, such as 2 KHz, can also be accommodated by assigning one time slot to that device and allowing the device to use that time slot as needed, e.g., once every four frames in the 2 KHz case. It is even possible to allow such devices to share a time slot, thereby making maximum use of the bus capacity.

A problem arises, however, when the bus needs to accommodate devices whose bus access rates are such that there is at least one pair of the rates for which neither rate of the pair is a multiple of the other, e.g., 9.6 Kb/s and 64 Kb/s. One way of accommodating this situation is to have one or more of the devices operating in an asynchronous mode in which the device accumulates its data until some prespecified amount of data has been saved up. The accumulated data is then applied to the bus during the next occurrence of a time slot assigned to the device. For example, a device which needs to place 9.6 Kb/s data on an 8 KHz bus may be assigned a single time slot and required to accumulate its data in blocks of 8 bits, each of which blocks is then placed on the bus at the next occurrence of the assigned time slot.

Other approaches to this problem are also known. Common to all of them, however, is the fact that the data is communicated asynchronously. This, then, requires the recipient of the data to regenerate a clock signal for the data using, for example, phase-locked loops or other circuit schemes. Disadvantageously, such circuitry is relatively expensive. The known schemes, moreover, are wasteful of the capacity of the communication medium because, depending on the scheme employed, the assigned time slot will carry either (a) redundant information or (b) no information during many, if not a majority, of the frames.

SUMMARY OF THE INVENTION

The above and other limitations of traditional TDM arrangements are overcome in accordance with the present invention, which is directed to a TDM arrangement which is capable of (a) assigning time slots to devices operating at any desired mix of access rates, and (b) having the time slot assigned to each device occur at exactly the access rate that the device needs. Thus, advantageously, data passes synchronously through the communication medium. Moreover, the capacity of the communication medium is used much more efficiently.

In accordance with the invention, the TDM frame is made up of what I refer to as "access periods". In general, each time slot recurs at a regularly-spaced number of access periods throughout the frame, referred to as the "walk time", and the pattern of time-slot-to-access-period assignments repeats in each successive frame.

The rate at which the access periods occur is chosen in such a way as to ensure that the walk time is some integral number of access periods for each desired communication medium access rate. In preferred embodiments, more specifically, the access period rate is an integer multiple of a minimum access period rate, the latter being arrived at by forming the least common multiple (LCM) of the desired access rates.

In addition, the total number of access periods that make up each frame, herein referred to as the frame length, is chosen in such a way as to ensure that two criteria are met. The first is that for each supported access rate, the regular spacing between access periods extends across the boundary between frames. The other is that for each possible combination of two supported access rates, it is possible to allocate respective sets of access periods to the time slots, and thus to the devices to which the time slots are assigned, in such a way that the access periods are mutually exclusive. In preferred embodiments, these criteria are satisfied by having a frame length formed as the least common multiple (LCM) of the walk times (expressed in access periods) associated with each of the desired access rates.

Advantageously, and in accordance with a feature of the invention, I have recognized that the process of allocating access periods to each time slot occurrence across the frame in such a way as to ensure that there are no conflicts, i.e., each access period is allocated to no more than one time slot, can be carried out by modeling the problem as a linear Diophantine equation and using a well-known lemma to identify solutions thereof.

The invention is useful not only in such traditional TDM applications as PBXs and digital transmission, but also in data communications equipment arrangements such as that disclosed in my copending U.S. patent application Ser. No. 227,815 filed of even date herewith and entitled "Data Communication Arrangement with Embedded Matrix Switch."

BRIEF DESCRIPTION OF THE DRAWING

In the drawing,

FIG. 7 is a block diagram of a controller for the TDM arrangement.

DETAILED DESCRIPTION

Figure 1:
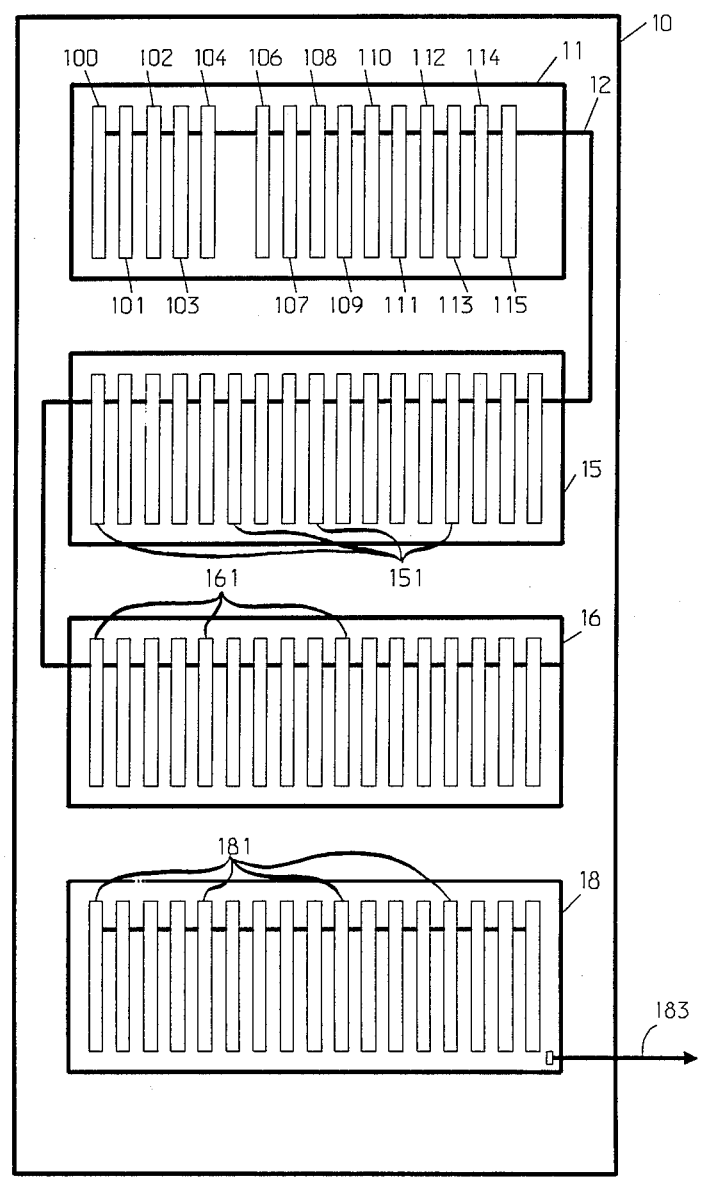
FIG. 1 depicts the front of an equipment cabinet containing data communications equipment including a time division multiplex (TDM) bus arrangement embodying the principles of the present invention.

FIG. 1 depicts the front of an equipment cabinet 10 containing circuitry embodying the principles of the present invention.

Figure 2:
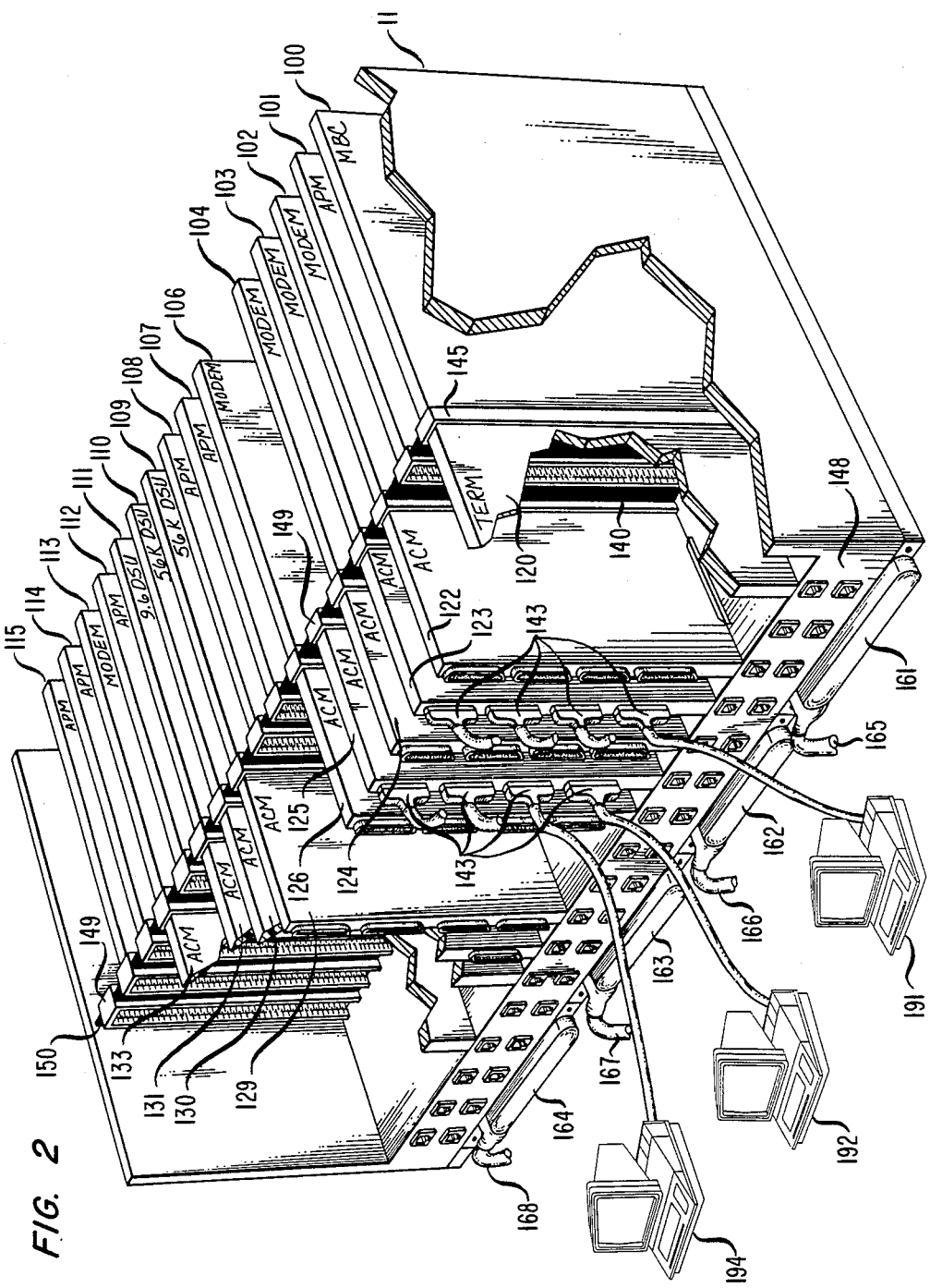
FIG. 2 is a rear perspective view of an equipment carrier within the cabinet of FIG. 1.
Figure 3:
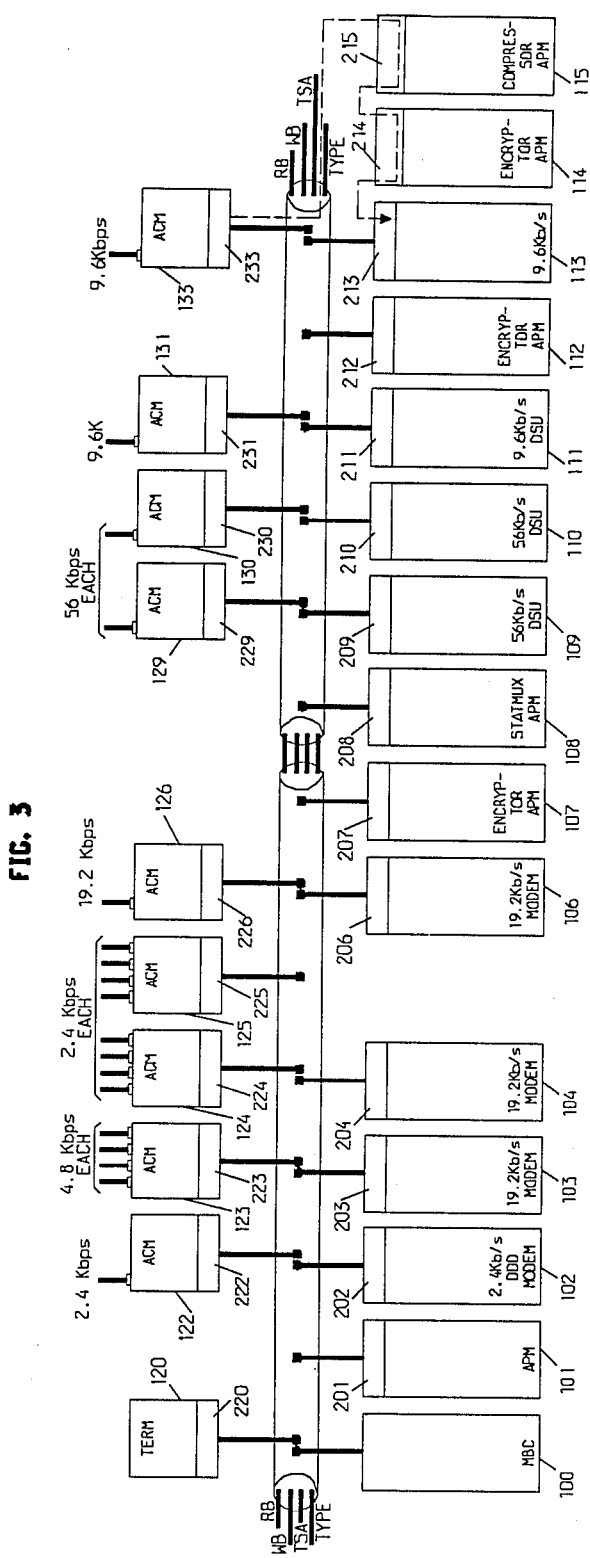
FIG. 3 is an electrical block diagram of the carrier of FIG. 3.

Mounted within cabinet 10 is an equipment carrier 11 shown in rear perspective view in FIG. 2 and in electrical block diagram form in FIG. 3. Carrier 11 has slots capable of receiving seventeen circuit cards inserted through the front of the carrier—referred to as "front circuit cards"—and slots capable of receiving another seventeen circuit cards inserted through the rear of the carrier—referred to as "rear circuit cards". Both the front and rear circuit cards mate into respective connectors 149, with the various pins of those connectors being interconnected by way of a fixed circuit board, or "midplane" 150, on which the connectors are mounted.

It is not necessary that all of the slots contain a circuit card. In particular, as seen from FIGS. 1-3, carrier 11 carries (a) fifteen front circuit cards 100-104 and 106-115 and (b) ten rear circuit cards 120, 122-126, 129-131 and 133. Included among the front circuit cards are cards which contain data communications units capable of (a) converting an outgoing binary data, or bit, stream into a signal suitable for transmission over a particular type of transmission channel, and (b) receiving such signals from the channel and recovering the data represented thereby. The circuit cards in this category include 2.4 Kb/s (kilobit per second) analog switched network modem 102, three 19.2 Kb/s analog private line modems 103, 104 and 106, two 56 Kb/s digital modems 109 and 110 (conventionally referred to as data service units, or DSUs), a 9.6 Kb/s DSU 111 and a 9.6 Kb/s analog private line modem 113.

Others of the front cards are so-called application modules, or APMs, each of which operates on the incoming and outgoing bit streams in accordance with a predetermined processing algorithm in one transmission direction and in accordance with the inverse of that algorithm in the other transmission direction. These illustratively include statistical multiplexer/demultiplexer 108, encryptor/decryptors 107, 112 and 114 and compressor/decompressors 101 and 115.

Another front card is Mbus controller 100 discussed hereinbelow.

Rear card 120 is a bus terminator card which contains circuitry providing an electrical termination for the Mbus discussed hereinbelow. Each of the remaining rear cards is a so-called access module, or ACM, which may have up to four ports. Data signals at various bit rates ranging from 2.4 Kb/s to 56 Kb/s are synchronously received from, and applied to, data terminal equipment such as CRT terminals, personal computers, etc., by way of the various access module ports. Specifically, signals from each piece of terminal equipment—illustratively personal computers 191, 192 and 194—are extended to a particular port of a particular access module by way of a respective cable 145 and connector 143. Each connector has a male portion attached to the cable and female portion attached to the access module. Connectors 143 are illustratively standard connectors as specified in EIA standard RS-232 and/or CCITT standard V.35.

Carrier 11 further includes standard telephone receptacles 148 mounted on the back of the carrier. These receptacles are used to route diagnostic and control information to and from the various front circuit cards.

In operation, data signals from the various pieces of data terminal equipment are routed from the associated cable 145 and connector 143 over a path which includes any desired number (including zero) of application modules and, at the end of the path, a predetermined modem or DSU. The output line signal thereupon generated by the modem or DSU is then routed to an associated communication channel by way of one of multipin telephone connectors 161-164 and associated cables 165-168. At the same time, data signals carried by input line signals received from the various communication channels are routed via the reverse path to the data terminal equipment.

As one example, an outgoing 2.4 Kb/s bit stream provided to one port of access module 122 may be routed directly to switched network modem 102 and, conversely, 2.4 Kb/s incoming data recovered by modem 102 will be routed directly back to that port. A second, more complex, example is graphically shown using dashed lines in FIG. 3. Here, a 19.2 Kb/s bit stream provided at one port of access module 133 is routed to compressor/decompressor 115 which generates a 9.6 Kb/s compressed bit stream. The latter is thereafter encrypted by encryptor/decryptor 114 and applied to analog private line modem 113. The modem, in turn, generates an analog line signal representing the encrypted 9.6 Kb/s stream and applies it to the analog private line by way of connector 164 and cable 168. At the same time, in the other direction of transmission, an analog line signal representing the encrypted/multiplexed bit stream is routed to analog private line to modem 113 also by way of cable 168 and connector 164. Modem 113 recovers the transmitted data stream from the received line signal embedded therein and that data stream is thereupon decrypted by encryptor/decryptor 112, decompressed by compressor/decompressor 115 and extended to access module 133.

As a third example, a 4.8 Kb/s bit stream provided at one of the connectors of access module 123 is routed to encryptor 107 and then to analog private line modem 103 where it is multiplexed with three other 4.8 Kb/s bit streams provided at respective ones of the other three access module 123 ports. A line signal representing the resulting composite 19.2 Kb/s bit stream is thereupon generated by analog private line modem 103 and applied to the associated private line. In the other direction of transmission, an analog line signal representing four individual 4.8 Kb/s streams, the first of which is in encrypted form, is recovered by modem 103 and demultiplexed into its four constituent 4.8 Kb/s component bit streams. The three non-encrypted streams are routed directly to the associated ports of access module 123 while the encrypted stream is first routed to encryptor/decryptor 107 and the resulting decrypted bit stream is thereupon routed to its associated access module port. (The multiplexing/demultiplexing provided by modem 103 could, alternatively, be provided inside access module 123, so that, for example, the 4.8 Kb/s bit stream at a particular port of access module 123 would be routed from that access module to encryptor/decryptor 107 and then back to access module 123 for multiplexing with the three other bit streams. The resulting 19.2 Kb/s stream would then be routed to modem 103.)

Carriers 15 and 16 are illustratively identical to carrier 11, although, in general, each carrier may have installed therein a different mix or arrangement of modems, DSUs, application modules and access modules, indicated generically at 151 and 161. Advantageously, the data path extending out from, or in to, an individual one of connectors 143 can include application modules, modems and/or DSUs in any of the three carriers 11, 15 and 16.

Carrier 18 is illustratively of somewhat different design than the others and, indeed, serves a different function. Specifically, carrier 18 is adapted to receive circuit cards containing so-called dial back-up units 181. Those leads within cables 165–168 that carry line signals for analog private line modems are connected to the telephone network by way of these dial back-up units and leads 183 so that if a private line associated with a modem fails or is otherwise unusable, a back-up connection can be made over the switched telephone network.

In accordance with the invention, communication among the various access modules, application modules, modems and DSUs is carried out using a time division multiplexed (TDM), communication medium—illustratively a bus 300 hereinafter referred to as the Mbus. As in any TDM bus arrangement, each device communicating over Mbus 300 is assigned one or more time slots. The occurrence of a particular time slot is signaled, in this embodiment, by the appearance of an associated time slot address, or TSA, on a set of Mbus address leads provided for the purpose. The devices communicating on the bus monitor these address leads and are enabled to access the bus for data input and output upon recognizing the address(es) of their assigned time slot(s).

The operation of Mbus 300 is administered by Mbus controller 100 which, as noted above, is one of the front circuit cards in carrier 11. Mbus controller 100 receives information from a human user—entered either at the Mbus controller front panel (not shown) or by way of a network management device (not shown)—specifying each desired data flow path, e.g., from a particular access module, through particular application modules (if any), and ultimately to a particular modem or DSU. Responsive to that information, controller 100 assigns time slots to all devices in the data flow.

As shown in FIG. 3, Mbus 300 extends through each of the three carriers 11, 15 and 16 in this embodiment, and Mbus controller 100 administers the Mbus throughout all three carriers. Alternatively, separate Mbus controllers could be installed in the left-most slot of each carrier and used to administer the Mbus within their respective carriers. In accordance with a possible combination of these approaches, Mbus controller 100 could be used to administer the Mbus throughout all three carriers while in Mbus controller in, say, carrier 15 serves as a backup.

Each time slot is uniquely associated with a particular bit stream. Thus, for example, a different time slot is assigned to each currently-in-use port of each access module. The modems and DSUs can also have multiple ports and a different time slot is similarly assigned to each currently-in-use one of these ports as well. (For example, in the present illustrative embodiment, a modem can multiplex up to 8 different bit streams.) The application modules can also have multiple ports—indeed as many as 32—and, in general, two time slots are assigned to each such port, as is described below. Thus in the setting up of a particular data flow through any one or more of the carriers 11, 15 and 16, the user has the complete flexibility to select ports from various access modules, route each individual bit stream to any desired port(s) of one or more application module(s) and to route the resulting bit streams to any desired port of a modem or DSU.

As shown in FIG. 3, Mbus 300 includes two multi-lead duplex data paths, a receive path RB and a send path SB. These paths are used to carry information among the Mbus controller and the various other devices communicating on the Mbus. For example, during normal data transfer, these paths carry the various connector 143 EIA signals that need to be passed between the data terminal equipment, on the one hand, and the modems and DSUs, on the other hand. Those signals include, for example, so-called customer data on the send data (SD) and receive data (RD) leads, request-to-send (RTS), clear-to-send (CTS), data set ready (DSR), etc.

The Mbus further includes time slot address field leads TSA, Mbus operation type field leads, labeled TYPE, and various control and timing leads (not shown). In general, a single time slot is assigned to each access module port, modem port and DSU port currently in use. To effect a transfer of information, the access module port places information on send path SB during its assigned time slot and concurrently takes in information from receive path RB. This is referred to as a network-side time slot. Conversely, the modems and DSUs, during the time slots assigned to their various ports, place information on receive path RB and take in information from send path SB, this being referred to as a user-side time slot. (When functions other than normal data transfer are carried out, e.g., a "limited option display" function or a maintenance function, as described below, the data flow on paths RB and SB is in whatever direction is required by that particular function.) Additionally both a network-side and user-side time slot is, in general, assigned to each port of each application module.

Figure 4:
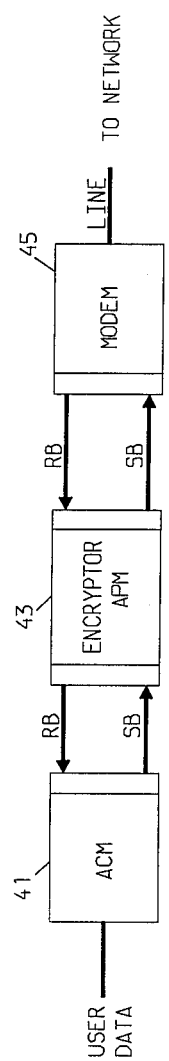
FIG. 4 shows an illustrative logical connection between two devices communicating over the TDM bus.

The foregoing may be more clearly understood be referring to FIG. 4, which shows an illustrative logical connection between a port of access module 122, encryptor/decryptor application module 107 and a port of modem 102. During the network-side time slot, access module 122 places on send path SB outgoing information appearing at its input and, at the same time, takes in incoming information from receive path RB. This same time slot, however, is a user-side time slot from the perspective of encryptor/decryptor 107 since it is currently taking in the information on send path SB and placing information on receive path RB. The converse relationship of network-side and user-side time slots obtains with respect to communication between encryptor/decryptor 107 and modem 102.

Mbus leads TSA carry addresses identifying the time slots of Mbus 300. Specifically, a unique address is assigned to each time slot. Each port connected to the Mbus monitors the TSA leads bus for a) the time slot address(es) assigned to it and/or b) a default address related to its location in the carrier. Whenever such a time slot or default address appears, the port performs a function defined by a code provided by Mbus controller 100 on the TYPE leads concurrently with the address. To the extent that the function invoked requires a transfer of information over the bus, such information is conveyed over one or both of paths RB and SB. There are, illustratively, five TYPE leads, so that a maximum of $2^5=32$ function codes can be supported. For example, code 00001, corresponding to the activity referred to as the Mbus Normal Cycle, causes the transfer of information between entities communicating on the Mbus, as in the example just discussed with reference to FIG. 4. As another example, codes 00100 and 00101 are used when a particular time slot address is to be assigned to a particular device, that address being is identified to the device via paths RB and/or SB. Yet another pair of codes, 01000 and 01001, cause an addressed port to convey, over paths RB and/or SB, such information about itself as its generic type (access module, application module, modem or DSU) and the data rate at which it operates. A complete list of the 32 function codes is shown in Table III discussed hereinbelow.

Each of the various devices 101, 102, ..., 133 connected to the Mbus includes a respective Mbus interface circuit 201, 202, ..., 233. This interface circuit is comprised of straightforward decoder circuitry which recognizes, for example, TYPE codes and addresses and which provides for the placing of data on, and removing the data from, the Mbus.

Central to typical prior art TDM arrangements is the notion of a "frame" divided into a predetermined number of time slots. The frame has a fixed, predetermined duration. Thus each time slot recurs at a fixed frequency, or rate, referred to herein as the "frame rate". For example, then, if the frame has a duration of 125 $\mu$ sec, each time slot recurs at a rate of $1/10^{-6}$ sec = 8 KHz. Each device communicating on the bus is assigned to one or more time slots and, when the time slot(s) occur, the device is enabled to place data on, and/or remove data from, the bus.

As long as the devices communicating on the TDM bus need to access the bus at a rate which is some multiple of the frame rate—so that each bus access rate is a multiple or submultiple of all the others—the assignment of time slots to particular devices and the actual communication of data over the bus are straightforward. For example, a device that needs to access the bus at a rate of 8 KHz is assigned a particular one time slot on the bus. A device that needs to access the bus at a rate of, say, 16 KHz would be assigned a particular two time slots, and so forth. Indeed, devices that need to access the bus at some submultiple of the frame rate, such as 2 KHz, can also be accommodated by assigning one time slot to that device and allowing the device to use that time slot as needed, e.g., once every four frames in the 2 KHz case. It is even possible to allow such devices to share a time slot, thereby making maximum use of the bus capacity.

A problem arises, however, when the bus needs to accommodate devices whose bus access rates are such that there is at least one pair of the rates for which neither rate of the pair is a multiple of the other, e.g., 9.6 Kb/s and 64 Kb/s. One way of accommodating this situation is to have one or more of the devices operating in an asynchronous mode in which the device accumulates its data until some prespecified amount of data has been saved up. The accumulated data is then applied to the bus during the next occurrence of a time slot assigned to the device. For example, a device which needs to place 9.6 Kb/s data on an 8 KHz bus may be assigned a single time slot and required to accumulate its data in blocks of 8 bits, each of which blocks is then placed on the bus at the next occurrence of the assigned time slot.

Other approaches to this problem are also known. Common to all of them, however, is is the fact that the data is communicated asynchronously. This, then, requires the recipient of the data to regenerate a clock signal for the data using, for example, phase-locked loops or other circuit schemes. Disadvantageously, such circuitry is relatively expensive. The known schemes, moreover are wasteful of the capacity of the bus because, depending on the scheme employed, the assigned time slot will carry either (a) redundant information or (b) no information during many, if not a majority, of the frames.

The above and other limitations of traditional TDM arrangements are overcome in accordance with the present invention, which is directed to a TDM arrangement which is capable of (a) assigning time slots to devices operating at any desired mix of bus access rates even though, for at least one pair of rates, neither rate of the pair is a multiple of the other, and (b) having the time slot assigned to each device occur at exactly the access rate that the device needs. Thus, advantageously, data passes synchronously through the bus. Moreover, bus capacity is used much more efficiently.

Specifically, the system of FIGS. 1–3 supports the following bus access rates (expressed in bus accesses/sec): 1200, 2400, 4800, 9600, 12,000, 14,000, 16,000 16,800, 19,200, 56,000 and 64,000. A TDM bus embodying the principles of the invention can thus be used to advantage because for many pairs of these rates, e.g., 4800 and 56,000, neither is a multiple of the other.

Figure 5:
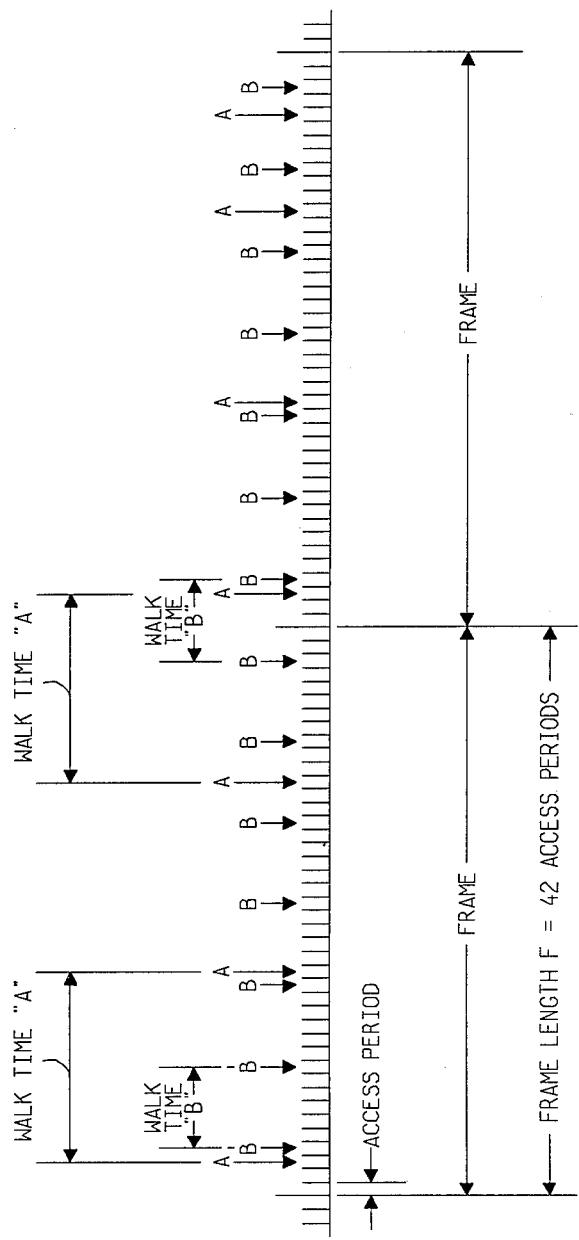
FIG. 5 is a graph helpful in explaining the principles of the present invention.

Central to my aforementioned TDM scheme is a redefinition of the notion of the TDM "frame". As shown by way of a simplified example in FIG. 5, the TDM frame in my arrangement is made up of a succession of what I refer to as "access periods". In general, each time slot recurs at the bus access rate of the respective device at a regularly-spaced number of access periods throughout the frame, referred to as the "walk time", and the pattern of access-period-to-time-slot allocation repeats in each successive frame. There is thus allocated to a particular time slot and, thus ultimately, to a particular device, a respective set of access periods of an individual frame and the corresponding sets of access periods in subsequent frames. This is illustrated in FIG. 5 for two time slots denoted "A" and "B". Note that time slot "A" occurs in the 3rd, 17th and 31st access periods of each frame, while time slot "B" occurs in the 4th, 10th, 16th, 22nd, 28th, 34th and 40th access periods of each frame.

One of the important parameters to be selected when designing a TDM arrangement of this type is the rate at which the access periods occur. This parameter is chosen in such a way as to ensure that the walk time—which is given by the ratio of the access period rate to the bus access rate—is some integral number of access periods for each desired bus access rate. Thus in the example of FIG. 5, the walk times for time slots "A" and "B" are the integers 14 and 6 respectively. In the general case, the minimum access period rate is arrived at by forming the least common multiple (LCM) of the desired bus access rates. Given the mix of desired bus access rates noted above, the LCM is given by $2^9 \times 3 \times 5^3 \times 7 = 1.344 \times 10^6$, as can be verified from Table I.

TABLE I

BUS ACCESS RATE FACTORIZATION

| Bus Access Rate | Prime Factors |
| --- | --- |
| 1200 | $2^4 \times 5^2 \times 3$ |
| 2400 | $2^5 \times 5^2 \times 3$ |
| 4800 | $2^6 \times 5^2 \times 3$ |
| 9600 | $2^7 \times 5^2 \times 3$ |
| 12,000 | $2^5 \times 5^3 \times 3$ |
| 14,000 | $2^4 \times 5^3 \times 7$ |
| 16,000 | $2^7 \times 5^3$ |
| 16,800 | $2^5 \times 5^2 \times 3 \times 7$ |
| 19,200 | $2^8 \times 5^2 \times 3$ |
| 56,000 | $2^6 \times 5^3 \times 7$ |
| 64,000 | $2^9 \times 5^3$ |

Indeed, this same minimum access period rate will support any bus access rate whose prime factors are $2^W \times 3^X \times 5^Y \times 7^Z$, where $W \leq 9$, $X \leq 1$, $Y \leq 3$ and $Z \leq 1$.

In addition, any integer multiple, $N = 1, 2, 3, \ldots,$ of the minimum access period rate can also be used as the excess period rate; multiplying the minimum access period rate by N will simply mean that there will be N times as many access periods between each occurrence of a time slot. Advantageously, however, multiplying the access period rate by N also increases the number of access periods in a frame by N, and thereby allows the bus to accommodate approximately N as many devices (assuming the same proportion of devices operating at the various bus access rates). In the present illustrative embodiment, in particular, $N = 2$. Thus the access period rate is 2,688 MHz.

(Although it is not a matter of practical concern, it may be noted for completeness that if the greatest common divisor of the desired bus access rates is unity, the LCM to be used as the minimum bus access rate is the LCM arrived at after first scaling all the bus access rates up by some factor, e.g., 2. Thus if the desired bus access rates were 3 and 7 bus accesses/sec, an LCM to be used in arriving at the minimum access period rate is the LCM of 6 and 14, which is $2 \times 3 \times 7 = 42$. Indeed, this is the example on which FIG. 5 is based.)

Another important parameter to be selected when designing a TDM arrangement of this type is the total number of access periods that make up each frame, herein referred to as the frame length F. Specifically, the frame length F is chosen in such a way as to ensure that two criteria are met. The first is that for each supported access rate, the regular spacing between access periods extends across the boundary between frames. That is, the spacing between each individual set in one frame and the corresponding set in the subsequent frame is equal to the walk time associated with that individual set. The other is that for each possible pair of supported bus access rates, it is possible to allocate a set of access periods to the time slots in such a way that the access periods allocated to the respective time slots are mutually exclusive. (By way of counterexample, it may be noted that for the case of the two bus access rates of 3 and 7 bus accesses/sec, a frame length of 21 satisfies the first criterion, but not the second. That is, there is not way to allocate a set of access periods of a 21-access-period frame to time slots at those rates without allocating one of the access periods in the frame to both of the time slots.)

The value of the frame length F is arrived at by forming the least common multiple (LCM) of the walk time (expressed in access periods) associated with each of the desired bus access rates. Criterion (a) above will thus be guaranteed to be satisfied because all walk times will then divide the frame length F exactly. In addition, it will be shown at a more opportune point hereinbelow that taking the frame length F as the LCM of the walk times also ensures that criterion (b) above is satisfied.

Determining the frame length F for the example of FIG. 5, we note that walk times for bus access rates of 3 bus accesses/sec and 7 accesses/sec are $42/3 = 14$ and $42/7 = 6$, respectively. The LCM for those walk times is, again, 42. Thus as seen in FIG. 5 each frame contains 42 access periods. In general, however, the frame length F and minimum bus access rate are not equal.

Table II shows how the frame length F is arrived at in the illustrative embodiment of FIGS. 1–3 for the mix of bus access rates used by the assumed ensemble of devices. As seen from Table II, Mbus 300 is not limited to transferring a single bit during each bus access. It is, rather, capable of transferring a constant number of anywhere from 1 to 4 data bits during each bus access. The data rate of 19.2 Kb/s is thus illustratively achieved using a 9600 bus accesses/sec time slot and transferring two bits per access, this being referred to as 2-bit latency. In addition, the data rate of 1.2 Kb/s is illustratively achieved using a 4800 bus accesses/sec time slot wherein each bit is repeated in each of four consecutive time slot occurrences, this being referred to as ¼-bit latency. Upon performing the walk time factorization and taking the LCM of the resulting prime factors, the frame length F is given by $$F = 2^6 \times 3 \times 5 \times 7 = 6720 \text{ access periods per frame,}$$

as can be seen from Table II.

TABLE II

WALK TIME FACTORIZATION

| Data Rate (Hz) | Latency (Bits) | Bus Access Rate (Hz) | Walk Time (Access Periods) | Prime Factors |
| --- | --- | --- | --- | --- |
| 1200 | ¼ | 4800 | 560 | $2^4 \times 5 \times 7$ |
| 2400 | ¼ | 9600 | 280 | $2^3 \times 5 \times 7$ |
| 4800 | 1 | 4800 | 560 | $2^4 \times 5 \times 7$ |
| 9600 | 1 | 9600 | 280 | $2^3 \times 5 \times 7$ |
| 12,000 | 1 | 12,000 | 224 | $2^5 \times 7$ |
| 16,800 | 1 | 16,800 | 160 | $2^5 \times 5$ |
| 19,200 | 2 | 9600 | 280 | $2^3 \times 5 \times 7$ |
| 56,000 | 4 | 14,000 | 192 | $2^6 \times 3$ |
| 64,000 | 4 | 16,000 | 168 | $2^3 \times 3 \times 7$ |

Once having established both (a) the rate at which the access periods recur and (b) the number of access periods in each frame, there then remains the task of "installing" the time slots by allocating a set of access periods to each time slot occurrence across the frame, taking into account the bus access rates required by those devices and the number of devices communicating at each different rate. That allocation must, of course, be carried out in such a way as to ensure that each access period is allocated to no more than one time slot. (To see how a problem might arise, not that if time slot "B" in FIG. 5 were shifted one access period to the "right", its third occurrence within the frame would conflict with the second occurrence of time slot "A".)

Once a first time slot has been installed, beginning at some selected access period within the frame, installation of each other time slot is illustratively carried out as follows:

(a) Select some non-allocated access period as the location of the first occurrence of the time slot to be installed;

(b) Determine if installation of the time slot beginning at that access period would cause a conflict anywhere within the frame with any other time slot already installed;

(c) If there would be a conflict, start the process again using a different nonallocated access period as the location of the first occurrence of the time slot to be installed;

(d) If there would not be a conflict, install the new time slot.

Advantageously, and in accordance with a feature of the invention, I have recognized that the process of determining whether two time slots will conflict (step "b" above) can be carried out by modeling the problem as a linear Diophantine equation and using a well known lemma to identify solutions thereof.

Specifically, given two time slots having respective walk times $W_1$ and $W_2$, it can be shown that there will be a conflict at at least one place within the frame if there is an integer solution for $\lambda$ and 82 in the range O-F in the linear Diophantine equation $$\lambda \times W_2 = \mu \times W_1 + k, \quad (1)$$

where k is the separation, measured in access periods, between any occurrence of the first time slot and any occurrence of the second time slot. Thus if there is such a solution, then in order to accommodate both time slots, one of them would have to be installed at a different starting pointone which yields no integer solution for $\lambda$ and $\mu$ in the range O-F.

Advantageously, the task of determining whether Eq. (1) does, in fact, yield integer solutions for $\lambda$ and $\mu$ in the range O-F, given the values of $W_1$, $W_2$ and k, can be accomplished quite easily using a number theory lemma which provides that an equation of this form has an integer solution for $\lambda$ and $\mu$ if and only if the greatest common divisor (GCD) of $W_1$ and $W_2$ divides k exactly. Therefore, in preferred embodiments, determining whether there is a solution comprises the easily-implemented steps of obtaining the GCD of $W_1$ and $W_2$ and determining whether the current value of k is divisible by this GCD or not.

We are now in position to show that, as stated above, selecting the frame length F as the least common multiple of the walk times assures that for each possible combination of two supported bus access rates, it is possible to install the time slots in such a way that the access periods allocated to those time slots are mutually exclusive. Specifically, the above lemma can also be restated as saying that there will be an integer solution to the Diophantine equation (and therefore a conflict somewhere within the frame) if and only if the walk times $W_1$ and $W_2$ are mutually prime. However, since, as discussed above, the frame length F is taken as the least common multiple of the prime factors of the walk times, then $W_1$ and $W_2$ are guaranteed to have a number other than unity as their GCD and therefore any pair of walk times can be accommodated because one can always find a value of k which that GCD does not divide.

As noted above, the operation of Mbus 300 is administered by Mbus controller 100 and it is convenient at this point to describe the latter's overall operation.

When first powered up, Mbus controller 100 performs two basic initial tasks. The first of these is to perform routine types of hardware checks. The other task is to take an inventory of what devices are currently held in carriers 11, 15 and 16. It accomplishes this by cycling through a set of default addresses, each of which uniquely identifies a particular port number for a particular slot in a particular carrier, and, using TYPE codes 01000 and 01001 described below, determines for each port its generic device type (access module, application module, modem or DSU) and the port data rate.

Having performed these two initial tasks, the Mbus controller waits for user-supplied instructions as to the desired data flow paths and associated attributes. The latter include, for example, whether a particular modem or DSU is to use internal or external timing; the number of bits to be transferred per time slot occurrence (latency); whether the reversing of various EIA leads, referred to as "frogging", is desired; or whether the device is to be part of a digital bridge. Upon receiving all such information, the Mbus controller proceeds to install time slots for all the currently-in-use ports. Installing a time slot, more particularly, includes the steps of (a) identifying a set of equally spaced access periods that are to be allocated to the time slot, (b) selecting a binary number to be used as the time slot address for that time slot on the Mbus, (c) conveying the selected time slot address to the port in question so that it "knows" what its assigned time slot address is. Once the time slot is installed, the Mbus controller can activate the time slot by beginning to actually issue the time slot address on the Mbus, whereby devices assigned to that time slot will be enabled to communicate over the Mbus.

Having installed time slots for all ports currently in use, the Mbus controller enters a background mode in which it performs such tasks as periodically checking the inventory of devices and reporting to the user whenever a circuit card is removed or a new one is inserted and periodically performing various integrity checks. In addition, the Mbus controller continues to be responsive to instructions entered by the user to, for example, set up new data flow paths or tear down old ones, these functions essentially involving the installation of new time slots and the deinstallation of existing ones.

Figure 6:
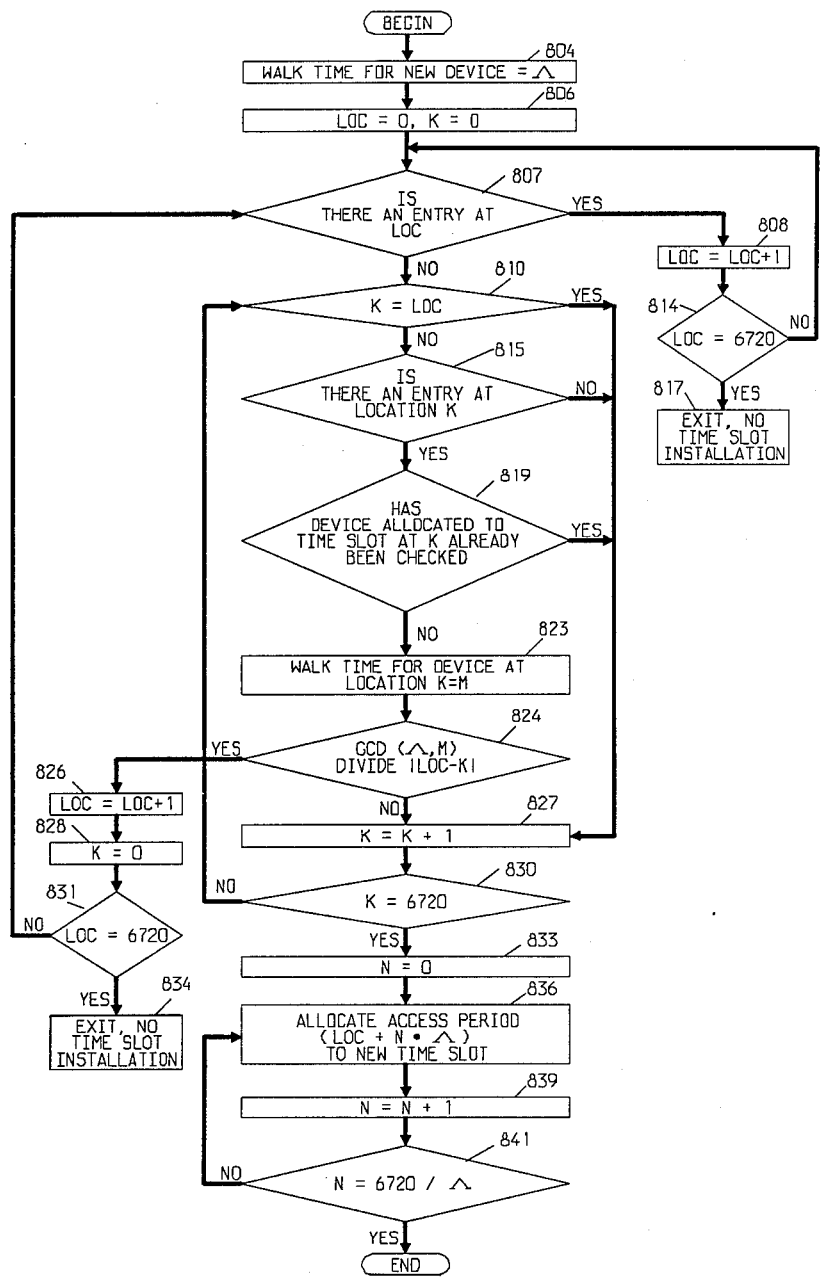
FIG. 6 is a flow chart depicting the procedure carried out within the TDM bus arrangement for allocating access periods to a particular time slot.

The flow chart of FIG. 6 depicts the procedure carried out by Mbus controller 300 in installing a time slot (referred to as the "new time slot") for a particular device (referred to as the "new device").

The procedure of FIG. 6 begins at block 804 at which the variable $\Lambda$ is set equal to walk time for the new device. Variables LOC and K are then cleared at 0 at 806. Variable LOC is a number which can take on a value between 0 and 6719 identifying the oridinal position within the frame, of "frame location", of the access period currently under consideration as the first access period of the time slot being installed. That access period will be referred to for convenience as "access period LOC". Variable K is also a number which also can take on a value between 0 and 6719. It identifies the frame location of the access period currently being examined for conflicts with the time slot being installed. That access period will be referred to for convenience as "access period K".

The procedure of FIG. 6 then enters a loop beginning at block 807 where it is determined whether access period LOC has already been allocated to another time slot. If it has, LOC is incremented at 808 and then compared to 6720 at 814. If LOC currently equals 6720, this means that all 6720 access periods of the frame have been considered and none was found usable as the first access period of the new time slot. In this case, the procedure terminates at 817 with no time slot installation having been made. If LOC is not equal to 6720, however, the loop is reentered at 807.

Once an unallocated access period has been found, the procedure enters an inner loop, beginning at block 810, in which it is determined whether the new time slot, if installed beginning at access period LOC, would conflict with access period K. There are three conditions under which it can be immediately determined that there will be no conflict. The first of these, considered at 810, is where K=LOC since an access period cannot conflict with itself. The second condition, considered at 815, is where access period K has not been allocated to any time slot. The third condition, considered at 819, is where access period K has already been allocated to another time slot, but it has already been determined in a previous pass through the loop that there was no conflict because there was no conflict with another access period allocated to that other time slot. In any of these cases, the procedure increments K at 827 and then compares it to 6720 at 830.

Assume that K does not currently equal 6720. This means that not all of the 6720 access periods of the frame have been considered for possible conflict with access period LOC and return is made to 810 to consider possible conflicts with the K+1$^{st}$ access period.

If none of the tests considered at 810, 815 or 819 indicate a no-conflict situation, this means that access period K has been allocated to a time slot that has not yet been checked for conflicts with access period LOC. In that case, the procedure proceeds from block 819 to blocks 823 and 824. At the former, a variable M is set to the walk time for the time slot to which access period K has been allocated. Following the lemma discussed hereinabove, it is then determined at 824 whether the greatest common divisor (GCD) of $\Lambda$ and M exactly divides the separation between the access periods LOC and K, that separation being given by $|LOC-K|$.

If that GCD does not exactly divide $|LOC-K|$, there is no conflict, in which case K is incremented at 827 and, again, return is made to 810 to consider possible conflicts with the (K+1)$^{st}$ access period. If, on the other hand, the determination at 824 indicates that there is a conflict, the new time slot cannot be installed beginning at access period LOC. In this case, the procedure proceeds to blocks 826 and 828 at which LOC is incremented and K is reset to 0. LOC is then compared to 6720 at 831. As with the test at 814, if LOC currently equals 6720, this means that all 6720 access periods of the frame have been considered and none was found usable as the first access period of the new time slot. In this case, the procedure terminates at 834 with no time slot installation having been made. If LOC is not equal to 6720, however, the loop is re-entered at 807.

Returning now to block 830, assume now that K is found to be equal to 6720. This means that access period LOC has been checked against all other access periods and no conflicts have been found. The new time slot can thus be installed beginning at access period LOC. To this end, the procedure proceeds to block 833 where an index N is cleared to 0. A loop comprising blocks 833, 836, 839 and 841 is then entered at which the frame locations of the access periods to be allocated to the new time slot are computed by adding N×$\Lambda$ to LOC, where N ranges from 0 to 6720/$\Lambda$.

The procedure of FIG. 6 is, of course, carried out for each device for which a time slot is to be installed in the Mbus. In order to install the time slots most efficiently, it is desirable to first install time slots for the 56 Kb/s devices. The reason for this is that every eighth access period between successive access periods allocated to a 14,000 bus accesses/sec (i.e., 56 Kb/s with latency of 4) time slot is unavailable for allocation to a time slot at any of the lower rates because, somewhere in the frame, a conflict will arise between two time such slots. Consider, for example, the bus access rates of 4800 and 14,000 bus accesses/second. The Diophatine equation for this case is $$\lambda \times 280 = \mu \times 192 + k,$$

Since the GCD of 192 and 280 is 8, $\lambda$ and $\mu$ have integer solutions for all k which are multiples of 8. Thus assigning time slots to the lower speed devices first may result in a situation where, even through there are many unallocated access periods, there is no place available to install time slots for the 56 Kb/s devices. (In the case of the 64 Kb/s devices, a conflict arises only once every 56 access periods and therefore, in general, this type of concern does not arise.)

Time slots assigned to individual 56 Kb/s devices do not conflict with each other, however. Therefore, efficient time slot assignment necessitates that the 56 Kb/s devices be assigned their time slots first, beginning at every eight access period, and that the time slots for the lower speed devices and the 64 Kb/s devices be assigned thereafter.

Once a time slot has been installed, it is necessary to assign a time slot address to that time slot and to communicate that address to each device which is to access the bus during that time slot. The time slot address will then be applied to leads TSA in each of the access periods allocated to the time slot along with the aforementioned TYPE code 00001, thereby causing the transfer of data between those devices.

Table III lists the 32 codes that can be issued on the Mbus TYPE leads, each corresponding to a different function to be performed.

TABLE III

| CODE | Mbus TYPE field. ACTIVITY |
| --- | --- |
| 00000 | Idle |
| 00001 | Mbus Normal Cycle |
| 00010 | Mbus Integrity Check - Network side |
| 00011 | Mbus Integrity Check - User side |
| 00100 | Time Slot Assign - Network side |
| 00101 | Time Slot Assign - User side |
| 00110 | Time Slot Modify |
| 00111 | Maintenance |
| 01000 | Limited Option Display - Network side |
| 01001 | Limited Option Display - User side |
| 01010 | Clock Phase - Network side |
| 01011 | Clock Phase - User side |
| 01100 | Undefined |
| 01101 | Undefined |
| 01110 | Monitor Time Slot |
| 01111 | Leads |

TABLE III-continued

Mbus TYPE field.

| CODE | ACTIVITY |
|---|---|
| 10000 | TSA Assign Alternate Data IN |
| 10001 | TSA Assign Alternate Data OUT |
| 10010 | Mbus Alternate Cycle |
| 10011 | Maintenance |
| 10100 | Clock Frequency - Network side |
| 10101 | Clock Frequency - User side |
| 10110 | Configuration Option Display |
| 10111 | Undefined |
| 11000 | Undefined |
| 11001 | Maintenance |
| 11010 | Reset |
| 11011 | Undefined |
| 11100 | Maintenance |
| 11101 | Undefined |
| 11110 | Undefined |
| 11111 | Maintenance |

The functions of these codes are as follows:

"Idle" code 00000 results in no action being taken by any device. This code may be present on the Mbus as the result of a power up sequence, and until the Mbus controller installs the time slots and initiates normal data activity.

"Mbus Normal Cycle" code 00001 causes the transfer of information between entities communicating on the Mbus, as described above in connection with FIG. 4.

"Mbus Integrity Check—Network side" cod 00010 and "Mbus Integrity Check—User side code" 00011 are used for diagnostic purposes. They cause the addressed entities to transfer predefined data patterns on the network- and user-sides, respectively.

"Time Slot Assign--Network side" code 00100 and "Time Slot Assign--User side" code 00101 are used to assign network- and user-side time slot addresses to the various ports communicating over the bus. When the time slot assign function is being carried out, a port is addressed port reads in the assigned address from the Mbus. In assigning time slots, the default address of a device is used as its assigned address on the user side. This approach provides two advantages. It provides for more efficient use of the address space than if the default addresses were not reused. In addition, because it is a deterministic approach, it precludes the need for Mbus controller 100 to maintain a database of address assignments.

"Time Slot Modify" code 00110 is issued to a device in order to modify a previously established connection between that device and another in accordance with a modifier code provided on bus SB. Such modifier codes may, for example, control (a) setting of a so-called "frogging" option involving the reversing of various EIA leads; (b) digital bridging of multipoint networks; and (c) the number of bits to be transferred during each time slot occurrence.

"Maintenance" codes 00111, 10011, 11001, 11100 and 11111 are used to effectuate various maintenance functionalities in the event of various malfunctions and error conditions.

"Limited Option Display—Network side" code 01000 and "Limited Option Display—User side" code 01001 cause the addressed device to provide device-independent information about itself on the Mbus such as the general kind of device it is, e.g., modem, application module, Mbus controller and the data rate at which is operates. Both network- and user-side codes are required because a device may operate at different data rates on the two different sides, a compressor/decompressor being a typical example. These codes can also be used in the course of periodic background diagnostic checks run by the Mbus controller to verify the inventory of devices in the carriers.

"Clock Phase—Network side" code 01010 provides a functionality, requestable by the user, which allows the system to account for differences between the Mbus controller clock and the send data timing supplied to an access module by the data terminal equipment (in the socalled external timing mode). Specifically, an access module can be arranged to count Mbus clock periods between edges of the external clock and report the current count when this code appears on the Mbus. Illustratively, the initially reported count—which appears on the RB and SB leads—continues to be updated by all intermediate devices between the access module and the modem so that the count ultimately received by the modem can be used to precisely align the phase of the external clock with the clock reproduced by the modem. In general, this count will stay constant over long periods of time but eventually will change up or down by one count due to the inevitable (albeit very small) timing difference. The occurrence of such a change can be used by the modem to adjust its reproduced time to match that of the data terminal equipment.

"Clock Phase—User side" code 01011 provides a similar functionality to the foregoing, but is used when the modem, rather than the data terminal equipment, supplies the send data timing (in the so-called internal or slave timing mode).

"Monitor Time Slot" code 01110 instructs a device, such as a protocol monitor application module, to latch the data that appears on the WC and RB leads for a particular time slot address without driving either bus.

"Leads" code 01111 is issued to devices that have identified themselves as modems in multibit mode, i.e., having a latency greater than 1, and it causes the accessed device to supply the states of its various EIA leads. The reason this code is needed is that in multibit mode, the data being transferred over the bus is encoded on up to five leads on SB and RB and thus not enough leads are available for the other EIA signals during an Mbus normal cycle.

As a result, use of the SB and RB leads that otherwise carry the EIA lead information during a normal cycle is preempted. Accordingly, a separate code is used for this purpose.

"TSA Assign Alternate Data IN" code 10000 and "TSA Assign Alternate Data OUT" code 10001 are used to double the available TSA address space by allowing each port to recognize a "regular" and an "alternate" time slot address.

"Mbus Alternate Cycle" code 10010 is used in the same way as code 00001 except that it refers to the alternate time slot address of the device being addressed.

"Clock Frequency—Network side" code 10100 is used in conjunction with "Clock Phase—Network side" code and allows for the passing of the number of Mbus clock periods between edges of the external clock.

"Clock Frequency—User side" code 10101 performs a similar function with respect to the number of Mbus clock periods between edges of the modem-derived clock.

"Configuration Option Display" code 10110 allows devices to pass device-dependent configuration information between themselves, such as the particular type of device it is, e.g., compressor/decompressor.

"Reset" code 11010 causes the port of a device addressed by its default time slot address to respond only to that address and all attributes of the time slot address return to default.

Two of the TYPE codes, 00001 and 10010, are always used in conjunction with installed time slots, i.e., on a repetitive basis at equally spaced points throughout the frame. Others of the TYPE codes are, by their nature, not amenable to such use. They are, rather, issued to a particular device on a "one-shot" basis, as needed, during any non-allocated access period. These codes are: 00010, 00011, 00100, 00101, 00110, 00111, 01000, 01001, 01110, 10000, 10001, 10011, 11001, 11010, 11100 and 11111. The other codes can be used in either mode depending on whether it is desired to repetitively invoke a function, such as a maintenance function, or to invoke it asynchronously as the need arises.

FIG. 7 is a block diagram of Mbus controller 100 which is controlled by a microprocessor 710 having an associated data bus 714 and address bus 715. Among the components connected to the data and address buses are memory 711, which includes both RAM and ROM; UARTS 713 used to communicate with the "outside world", e.g., the Mbus front panel and various external diagnostic control systems; Mbus state machine 720; and three dual-ported memories 731, 732 and 734. Mbus controller 100 also includes various other components and leads that are standard in microprocessor-based arrangements—control leads, decoder chips, etc.—that are not explicitly shown but whose presence in the system and whose use will be apparent to those skilled in the art.

Within state machine 720, timing circuit 721 generates timing pulses at the access period rate of 2.688 MHz. These timing pulses are distributed across the Mbus via buffer 746 and various Mbus clock lead(s) (not shown). The timing pulses from circuit 721 are also applied, inter alia, to a counter 725, which applies binary addresses between zero and decimal 6719 to the address input at the "right-hand" port of dual-ported memory 731 at the access period rate. Memory 731 has 6720 memory locations, each indexed by the ordinal position within the TDM frame of a particular bus access period. This memory is accessed at its "left-hand" port by microprocessor 710 to store at the $i^{th}$ location therein two pieces of data—the assigned address of any time slot to which the $i^{th}$ access period in question has been allocated and the TYPE code associated with the time slot, e.g., "Mbus normal cycle" code 00001, "Monitor Time Slot" code 01110, "Leads" code 01111, etc. Thus when the address of the $i^{th}$ access period is applied to memory 731 and, assuming that that access period has been allocated to a time slot, the associated TYPE code and time slot address are provided by memory 731 on bus 735.

The TSA and TYPE code provided on bus 735 during a particular clock period are applied to the Mbus during the next clock period. To this end, the TSA on bus 735 is latched into latch 741 while the TYPE code, passing through a multiplexer 743 as described below, is latched into latch 744. Responsive to the next clock pulse, the TSA and TYPE code stored in latches 741 and 744 are provided on the Mbus via buffers 742 and 745, respectively.

The second dual ported memory 732 has 2048 memory locations, each indexed by a respective one of 2048 possible time slot address values. Two one-bit flags are stored at each location, one of which is a so-called "valid" flag, F(0). This flag indicates whether the associated time slot address is valid, i.e., currently assigned to some device. When a particular TSA is put out on bus 735 by memory 731 as mentioned above, that TSA is applied to the address input of memory 732, thereby causing the associated F(0) flag to be extended to programmable array logic (PAL) decoder 747. If the value of F(0) indicates that the TSA in question is valid, PAL 747 controls multiplexer 743 via lead 753 so as to select the multiplexer's "upper" input, thereby allowing the TYPE code provided on bus 735 by memory 731 to be latched into latch 744, as described above. On the other hand, if the value of F(0) indicates that the TSA in question is invalid, PAL 747 controls multiplexer 743 via lead 753 so as to select the multiplexer's "lower" input which is tied to ground. This, in practical effect, causes "Idle" code 0000 to be latched into latch 744. Thus no action will take place during the upcoming bus access period.

(In theory, the functionality provided by use of "valid" flag F(0) as just described could be accomplished by ensuring that an "Idle" code is stored in each location of memory 731 that corresponds to an unallocated bus access period. Such an approach, however, would require that whenever a particular TSA became invalid because, for example, the device using the time slot was being assigned a different time slot or being taken out of service altogether, a large number of locations in memory 731 would have to be addressed to change the TYPE code to "Idle". This is a time-consuming operation, as compared to needing to change the value of only a single bit, viz., the "valid" flag associated with the TSA in question stored in memory 732 and simply leaving the contents of those particular locations in memory 731 as "garbage".

Consider also the fact that when a time slot is being installed, it is necessary to write its assigned TSA and TYPE code in a large number of locations of memory 731. However, the speed with which the locations of memory 731 are accessed in response to the output of counter 725 is far greater than the speed with which microprocessor 710 is able to change the information stored in those large number of memory 731 locations. A potential problem thus arises because it is not desirable to have the contents of the locations in question acted upon until all of them have been filled. Advantageously, use of the "valid" flag ensures that the problem will not, in fact, eventuate because, until the "valid" flag associated with the TSA in question has been set, an "Idle" code will be put out on the Mbus whenever the TSA appears. Once all of the appropriate locations in memory 731 have been filled, it is a simple matter for microprocessor 710 to address memory 732 at its left-hand port to change the "valid" flag value. Similar considerations apply when a time slot is being de-installed.)

Consider, now, the case where it is desired to issue a TYPE code to a particular device not on a repetitive basis by way of an assigned time slot, but on a single, or "one shot" basis. Assume, for example, that Mbus controller 100 needs to inform a device of the TSA for a network-side time slot that is being newly assigned to the device.

To accomplish this, microprocessor 710 enters the default address of the device in question and the desired TYPE code, viz., "Time Slot Assign—Network Side" code 00100, into latch 722 within state machine 720. At the same time, the microprocessor accesses the left-hand port of a third dual-ported memory 734 to store therein, at a location indexed by the default address of the device, the data associated with the function to be performed—in this example the identity of the new TSA. These functions having been performed, the microprocessor sets a flip-flop 724 within state machine 720, thereby priming the Mbus controller to perform the desired function during the next available access period.

Specifically, PAL decoder 747 monitors the "valid" flag F(0) that is output by memory 732, the TYPE code on bus 735 and the output of flip-flop 724 on lead 758. If flop-flop 724 is set and either (a) the value of the "valid" flag indicates that the TSA currently output by memory 731 is not currently in use or (b) the TYPE code for that TSA is "Idle" code 0000, then PAL decoder 747 provides an indication to PAL decoder 748 on lead 740 that the upcoming access period is available. (The set state of flip-flop 724 also serves to prevent PAL decoder 747 from selecting the lower path of multiplexer 743 in response to "valid" flag F(0) as described earlier.)

PAL decoder 748, in turn, responds to the set state of flip-flop 724 and the aforementioned signal on lead 740 to provide a number of functions. Specifically, it controls memory 731 via lead 736 to go into a high-impedance state, thereby effectively disconnecting memory 731 from bus 735; controls latch 722 via lead 755 to cause it to output onto bus 735 the default address and TYPE code that were previously placed in latch 722 by the microprocessor; controls the read/write input of memory 734 via lead 756 so as to place that memory in its "read" mode; and controls multiplexer 738 to select its "upper" path, thereby causing the default address now on bus 735 to be applied to the address input of memory 734, whereby the data associated with that default address previously stored in memory 734 by the microprocessor is output by memory 734 onto bus 761 and latched into a latch 749. During the next bus access period, then, the default address of the device in question, "Assign Type Code-Network Side" code 00100 and the TSA to be assigned are clocked out of their respective latches 741, 744 and 749 to the Mbus via buffers 742, 745 and 750, respectively. PAL decoder 748 thereupon resets flip-flop 724 via lead 754, and the resulting transition at the output of the flip-flop generates an interrupt to microprocessor 710 on interrupt lead 716, indicating that the desired function has been completed.

One other functionality of Mbus controller 100 is the capability of monitoring the current states of the RB and SB leads during particular time slots. In particular, when it is desired to monitor the states of the RB and SB leads for a particular time slot, microprocessor 710 accesses memory 732 at the location indexed by the TSA of that time slot and sets a "monitor" flag, F(1), stored at that location. Thereafter, whenever the address in question occurs on bus 735, the set "monitor" flag is presented to PAL decoder 748. In the next bus access period, during which the time slot for the device in question actually occurs, PAL decoder 748 switches memory 734 to its "write" mode via the signal on lead 756; controls multiplexer 738 to select its lower path, thereby indexing memory 734 with the address currently on the Mbus, extended via bus 764; and enables buffer 751 so as to cause the current states of the RB and Sb leads to be applied to the data input of memory 734.

The foregoing is merely illustrative of the present invention.

For example, although in the present illustrative embodiment, signals are carried to and from the data terminal equipment via individual cables, other embodiments may multiplex the signals from the various pieces of data terminal equipment into a single composite signal which is demultiplexed under the control of the Mbus controller and thereupon communicated over the Mbus.

Other variations are possible. For example, although the invention is disclosed herein in the context of an embodiment in which the occurrence of a particular time slot is signalled to the device assigned thereto by way of a time slot address communicated over the communication medium, e.g., bus, it is also possible to communicate to each device the location within the frame of the access periods allocated thereto and rely on the device itself to identify the occurrence of its allocated access periods by counting access period clocks. In such an approach, an "alignment mark" TYPE code would be issued by the Mbus controller during, say, the first access period of each frame, thereby allowing all of the devices communicating on the bus to identify the start of each frame.

Moreover, it is important to note that although the invention is disclosed herein in the context of a technique for interconnecting modems, DSUs, application modules, etc., in an equipment cabinet, it is equally usable in other applications which may use time division multiplexing—particularly those involving communication at both the standard data rates of 1.2 Kb/s and the standard digitized speech rates of, for example, 32 Kb/s and 64 Kb/s. One such application is in PBXs, which although they are today capable of handling such a mix of bit rates over their internal TDM buses, do so following the prior art approaches outline hereinabove. They therefore suffer the disadvantages also outlined hereinabove.

In this same vein, it is important to note that the invention could be used to advantage in the data transmission art wherein, again, data and digitized speech signals may be mixed. In such transmission applications, more particularly, the communicating entities are, of course, not co-located devices communicating within equipment over an internal bus as the communication medium, as in the present illustrative embodiment and in PBXs. They are, rather, physically separated transmit/receive units communicating long distances using, for example, coaxial, lightwave or radio transmission facilities as the communication medium. However, the principles of the invention including, for example, those relating to the determination of an appropriate access period rate and frame length, and the installing of time slots, would be applied in just the same way. Indeed, it can be said that the transmission line is functioning as a bus in such applications. Moreover, it may be noted that signals that are carried on physically distinct leads in the internal-bus-based applications could, in the data transmission environment, be communicated in parallel using, for example, frequency division multiplexing.

It will thus be appreciated that although a specific arrangement embodying the principles of the invention has been shown and described herein, those skilled in the art will be able to devise numerous other arrangements which embody those principles and are thus within the spirit and scope of the invention.

I claim:

1. A time division multiplex arrangement comprising
   a communication medium,
   a plurality of devices for generating respective streams of data at respective synchronous bit rates, there being at least one pair of said rates for which neither rate of the pair is a whole number multiple of the other,
   means for causing each said device to apply to said medium, during each of a succession of access periods allocated to that device, a constant number of bits of the respective bit stream, the access periods allocated to each said device occurring at equally spaced time intervals, said time intervals being of equal duration.

2. The invention of claim 1 wherein said communication medium is a bus.

3. The invention of claim 2 further comprising means for applying to said bus during each access period allocated to an individual one of said devices one of a plurality of signals identifying a respective function to be performed by that device when it accesses said bus during the access periods allocated thereto.

4. The invention of claim 2 wherein said means for causing includes means for applying to said bus, for each device, an address assigned to the access periods allocated to that device and means associated with said each device for causing it to access said bus when the address of the access periods allocated to that device appears on said bus.

5. A time division multiplex arrangement for use with a communication medium, said arrangement comprising
   a plurality of devices adapted to access said communication medium at respective access rates, there being at least one pair of said rates for which neither rate of the pair is a whole number multiple of the other,
   means for defining a succession of access periods occurring at a predetermined access period rate which is a whole number multiple of the least common multiple of all of said access rates, said access periods occurring in frames of F access period each, F being a predetermined number,
   means of allocating to each said device a respective set of the access periods of an individual one of said frames and the corresponding sets of access periods in subsequent frames, the access periods of each set recurring at the access rate of the respective device, the spacing between the access periods of each set being a walk time associated with that set and with the respective device, and said number F being a whole number multiple of the least common multiple of the walk times associated with all of said devices, and
   means for causing each said device to access said communication medium during its respective set of access periods.

6. The invention of claim 5 wherein, for each said device, a constant number of information bits is transferred between that device and said communication medium during each of the access periods allocated to that device for a succession of said frames.

7. The invention of claim 6 wherein said means for allocating includes means for allocating a particular set of access periods to an individual one of said devices only if the spacing between a selected one of the access periods of said particular set and a selected one of the access periods of each set then allocated to others of said devices is not divisible by the greatest common divisor of the walk time associated with said individual one of said devices and the walk time associated with each of said others of said devices.

8. The invention of claim 7 further comprising means for applying to said communication medium during each access period allocated to an individual one of said devices one of a plurality of signals identifying a respective function to be performed by that device when it accesses said communication medium during the access periods allocated thereto.

9. The invention of claim 8 wherein said respective function is the transferring of a predetermined number of bits between said communication medium and said individual one of said devices.

10. The invention of claim 8 wherein said means for causing said devices to access said communication medium includes means for applying to said communication medium, for each said device, an address assigned to the set of access periods allocated to that device and means associated with said each device for causing it to access said communication medium when the address of the set allocated to that device appears on said communication medium.

11. The invention of claim 5 further comprising means for applying to said communication medium during a selected one of said access periods not then allocated to any of said devices a signal identifying a function to be performed by a selected one of said devices only during said selected access period and means for causing said selected device to respond to said signal to perform said function.

12. The invention of claim 11 wherein said function is the reading by said selected device from said communication medium of an address associated with the set of access periods allocated to said device.

13. The invention of claim 11 wherein said means for causing said selected device to respond includes means for applying to said communication medium an address associated with said selected device and means associated with said selected device for recognizing said address.

14. A time division multiplex arrangement comprising
    a bus,
    a plurality of devices adapted to access said bus at respective bus access rates,
    means for defining a succession of access periods occurring at a predetermined access period rate, said access periods occurring in frames of F access periods each, F being a predetermined number,
    means for allocating to each said device a respective set of the access periods of an individual one of said frames and the corresponding sets of access periods in subsequent frames, the access periods of each set recurring at the bus access rate of the respective device and the spacing between the access periods of each set being a walk time associated with that set and with the respective device, and
    means for causing each of said devices to access said bus during its respective set of access periods,
    characterized in that there is at least one pair of said rates for which neither rate of the pair is a whole number multiple of the other, and further characterized in that said number F and said access period rate are such that each pair of sets in a frame can be comprised of mutually exclusive access periods within that frame and such that the spacing between each individual set in one frame and the corresponding set in the subsequent frame is equal to the walk time associated with said individual set.

15. The invention of claim 14 wherein, for each said device, a constant number of information bits is transferred between that device and said bus during each of the access periods allocated to that device for a succession of said frames.

16. The invention of claim 14 wherein said access period rate is a whole number multiple of the least common multiple of all of said bus access rates and wherein said number F is a whole number multiple of the least common multiple of the walk times associated with all of said sets.

17. The invention of claim 16 wherein said means for allocating includes means for allocating a particular set of access periods to an individual one of said devices only if the spacing between a selected one of the access periods of said particular set and a selected one of the access periods of each set then allocated to others of said devices is not divisible by the greatest common divisor of the walk time associated with said individual one of said devices and the walk time associated with each of said others of said devices.

18. The invention of claim 17 further comprising means for applying to said bus during each access period allocated to a particular one of said devices one of a plurality of signals identifying a respective function to be performed by that device when it accesses said bus during the access periods allocated thereto.

19. The invention of claim 18 wherein said respective function is the transferring of a predetermined number of bits between said bus and said individual one of said devices.

20. The invention of claim 18 wherein said means for causing said devices to access said bus includes means for applying to said bus, for each said device, an address assigned to the set of access periods allocated to that device and means associated with said each device for causing it to access said bus when the address of the set allocated to that device appears on said bus.

21. The invention of claim 16 further comprising means for applying to said bus during a selected one of said access periods not then allocated to any of said devices a signal identifying a function to be performed by a selected one of said devices only during said selected access period and means for causing said selected device to respond to said signal to perform said function.

22. The invention of claim 21 wherein said function is the reading by said selected device from said bus of an address associated with the set of access periods allocated to said device.

23. The invention of claim 21 wherein said means for causing said selected device to respond includes means for applying to said bus an address associated with said selected device and means associated with said selected device for recognizing said address.

24. A time division multiplex arrangement comprising,
a bus,
a plurality of devices adapted to access said bus at respective bus access rates, there being at least one pair of said rates for which neither rate of the pair is a whole number multiple of the other,
means for defining a succession of access periods occurring at a predetermined access period rate which is a whole number multiple of the least common multiple of all of said bus access rates, said access periods occurring in frames of F access periods, each, F being a predetermined number,
means for allocating to each said device a respective set of the access periods of an individual one of said frames and the corresponding sets of access periods in subsequent frames, the access periods of each set recurring at the bus access rates of the respective device, the spacing between the access periods of each set being a walk time associated with that set and with the respective device, and said number F being a whole number multiple of the least common multiple of the walk times associated with all of said devices, and
means for applying to said bus during the set of access periods allocated to each said device an address associated with that set and a signal identifying a function to be performed by that device, said each device being adapted to perform said function when said address appears on said bus.

25. A method for use in a time division multiplex arrangement of a type which includes a communication medium and a plurality of devices for generating respective streams of data at respective synchronous bit rates, there being at least one pair of said rates for which neither rate of the pair is a whole number multiple of the other,
causing said device to apply said medium, during each of a succession of access periods allocated to that device, a constant number of bits of the respective bit stream, the access periods allocated to each said device occurring at equally spaced time intervals, said time intervals being of equal duration.

26. The invention of claim 25 wherein said communication medium is a bus and wherein said method includes the further step of applying to said bus during each access period allocated to an individual one of said devices one of a plurality of signals identifying a respective function to be performed by that device when it accesses said bus medium during the access periods allocated thereto.

27. A method for use in a time division multiplex arrangement of the type comprising a bus and a plurality of devices adapted to access said bus at respective bus access rates, there being at least one pair of said rates for which neither rate of the pair is a whole number multiple of the other, said method comprising the steps of
defining a succession of access periods occurring at a predetermined access period rate which is a whole number multiple of the least common multiple of all of said bus access rates, said access periods occurring in frames of F access periods each, F being a predetermined number,
allocating to each said device a respective set of the access periods of an individual one of said frames and the corresponding sets of access periods in subsequent frames, the access periods of each set recurring at the bus access rate of the respective device, the spacing between the access periods of each set being a walk time associated with that set and with the respective device, and said number F being a whole number multiple of the least common multiple of the walk times associated with all of said devices, and causing each said device to access said bus during its respective set of access periods.

28. The invention of claim 27 wherein, for each said device, a constant number of information bits is transferred between that device and said bus during each of the access periods allocated to that device for a succession of said frames.

29. The invention of claim 28 wherein said allocating step includes the step of allocating a particular set of access periods to an individual one of said devices only if the spacing between a selected one of the access periods of said particular set and selected one of the access periods of each set then allocated to others of said devices is not divisible by the greatest common divisor of the walk time associated with said individual one of said devices and the walk time associated with each of said others of said devices.

30. The invention of claim 29 comprising the further step of applying to said bus during each access period allocated to an individual one of said devices one of a plurality of signals identifying a respective function to be performed by that device when it accesses said bus during the access periods allocated thereto.

31. The invention of claim 30 wherein said respective function is the transferring of a predetermined number of bits between said bus and said individual one of said devices.

32. The invention of claim 30 wherein said step of causing each said device to access said bus includes the steps of
applying to said bus, for each said device, an address assigned to the set of access periods allocated to that device, and
causing each device to access said bus when the address of the set allocated to that device appears on said bus.

33. The invention of claim 27 comprising the further steps of
applying to said bus during a selected one of said access periods not then allocated to any of said devices a signal identifying a function to be performed by a selected one of said devices only during said selected access period and
causing said selected device to respond to said signal to perform said function.

34. The invention of claim 33 wherein said function is the reading by said selected device from said bus of an address associated with the set of access periods allocated to said device.

35. A method for use in a time division multiplex arrangement of the type which comprises a communication medium, a plurality of devices adapted to access said communication medium at respective access rates and means for defining a succession of access periods occurring at a predetermined access period rate, said access periods occurring in frames of F access periods each, F being a predetermined number, the method comprising the steps of
allocating to each said device a respective set of the access periods of an individual one of said frames and the corresponding sets of access periods in subsequent frames, the access periods of each set recurring at the access rate of the respective device and the spacing between the access periods of each set being a walk time associated with that set and with the respective device, and
causing each of said devices to access said communication medium during its respective set of access periods,
characterized in that there is at least one pair of said rates for which neither rate of the pair is a whole number multiple of the other, and further characterized in that said number F and said access period rate are such that each pair of sets in a frame can be comprised of mutually exclusive access periods within that frame and such that the spacing between each individual set in one frame and the corresponding set in the subsequent frame is equal to the walk time associated with said individual set.

36. The invention of claim 35 wherein, for each device, a constant number of information bits is transferred between that device and said communication medium during each of the access periods allocated to the device for a succession of said frames.

37. The invention of claim 35 wherein said access period rate is a whole number multiple of the least common multiple of all of said access rates and wherein said number F is a whole number multiple of the least common multiple of the walk times associated with all of said sets.

38. The invention of claim 37 wherein in said allocating step a particular set of access periods is allocated to an individual one of said devices only if the spacing between a selected one of the access periods of said particular set and selected one of the access periods of each set then allocated to others of said devices is not divisible by the greatest common divisor of the walk time associated with said individual one of said devices and the walk time associated with each of said others of said devices.

39. The invention of claim 38 comprising the further step of applying to said communication medium, during each access period allocated to a particular one of said devices, one of a plurality of signals identifying a respective function to be performed by that device when it accesses said communication medium during the access periods allocated thereto.

40. The invention of claim 39 wherein said respective function is the transferring of a predetermined number of bits between said communication medium and said individual one of said devices.

41. The invention of claim 39 wherein said step of causing each of said devices to access said communication medium includes the steps of
applying to said communication medium, for each said device, an address assigned to the set of access periods allocated to that device and
causing each device to access said communication medium when the address of the set allocated to that device appears on said communication medium.

42. The invention of claim 37 comprising the further steps of
applying to said communication medium during a selected one of said access periods not then allocated to any of said devices a signal identifying a function to be performed by a selected one of said devices only during said selected access period and
causing said selected device to respond to said signal to perform said function.

43. The invention of claim 42 wherein said function is the reading by said selected device from said communication medium of an address associated with the set of access periods allocated to said device.

* * * * *